J. MOLL.
EGG TESTER.
APPLICATION FILED AUG. 13, 1920.

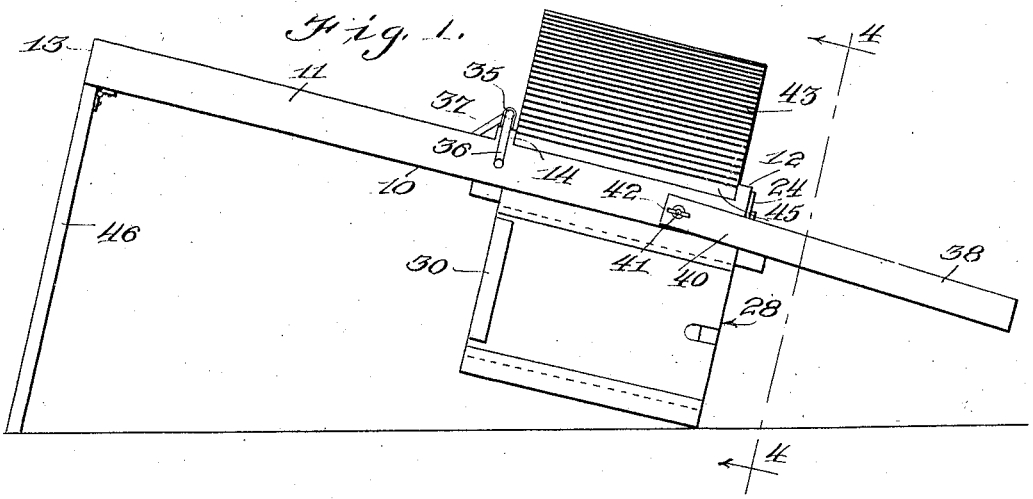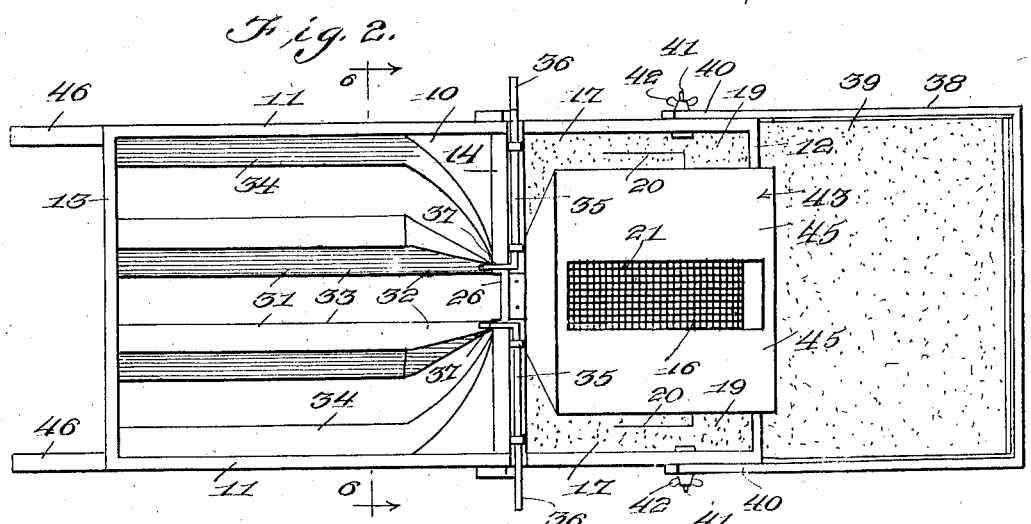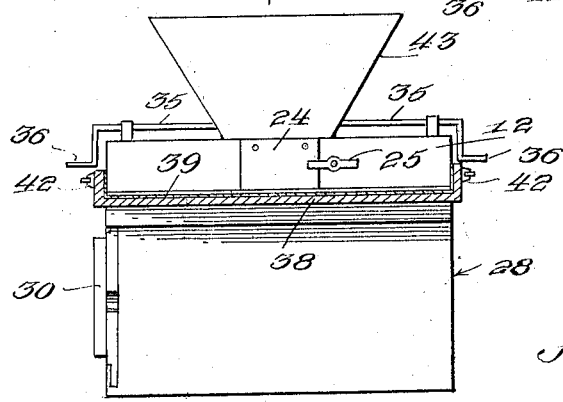

1,360,987.

Patented Nov. 30, 1920.
3 SHEETS—SHEET 2.

Julius Moll,
INVENTOR

BY Victor J. Evans
ATTORNEY

WITNESS W. Johnson
Jam. Jester

J. MOLL.
EGG TESTER.
APPLICATION FILED AUG. 13, 1920.

1,360,987.

Patented Nov. 30, 1920
3 SHEETS—SHEET 3.

Julius Moll,
INVENTOR

UNITED STATES PATENT OFFICE.

JULIUS MOLL, OF MASCOUTAH, ILLINOIS.

EGG-TESTER.

1,360,987.   Specification of Letters Patent.   Patented Nov. 30, 1920.

Application filed August 13, 1920. Serial No. 403,284.

*To all whom it may concern:*

Be it known that I, JULIUS MOLL, a citizen of the United States, residing at Mascoutah, in the county of St. Clair and State of Illinois, have invented new and useful Improvements in Egg-Testers, of which the following is a specification.

This invention relates to egg testing devices and has for its object the provision of a device by means of which a large number of eggs may be candled or tested to ascertain their freshness in a very quick and efficient manner, the device being so constructed that each egg being tested rolls over a screen through which light passes from a source below the screen, an eye piece being provided above the screen for excluding outside light and enabling the operator to inspect the eggs during their movement over the screen.

Another object is the provision of a device of this character which is provided with means whereby eggs incubated may be accurately examined for ascertaining their condition.

An important object is the provision of a device of this character which includes an egg tray formed of a plurality of sections, the walls dividing the sections being movable and serving as switches whereby the eggs in the successive sections may be allowed to pass through the testing portion proper.

An additional object is the provision of a device of this character which will be comparatively simple and inexpensive in manufacture, a great labor saver in use, and a general improvement in the art.

With the above and other objects and advantages in view, the invention consists in the details of construction to be hereinafter more fully described and claimed and illustrated in the accompanying drawings in which—

Figure 3:
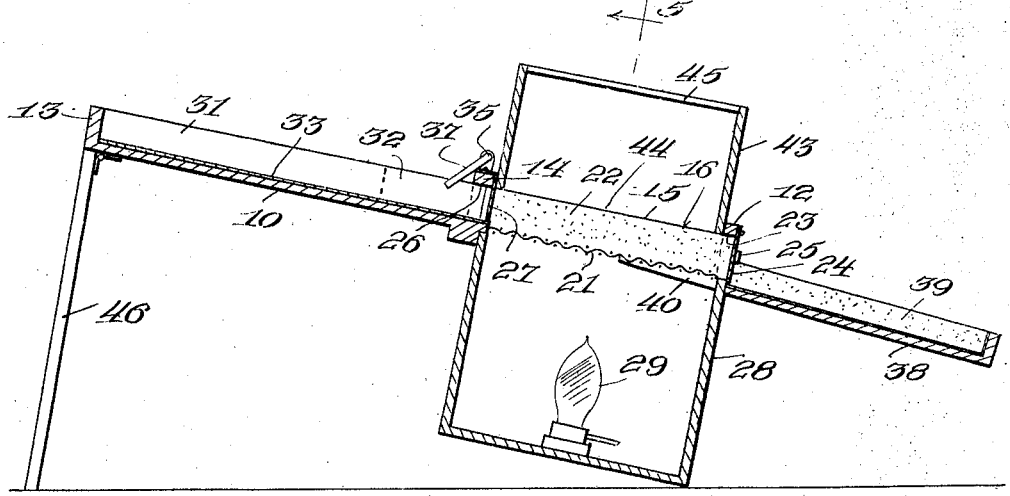
Figure 5:
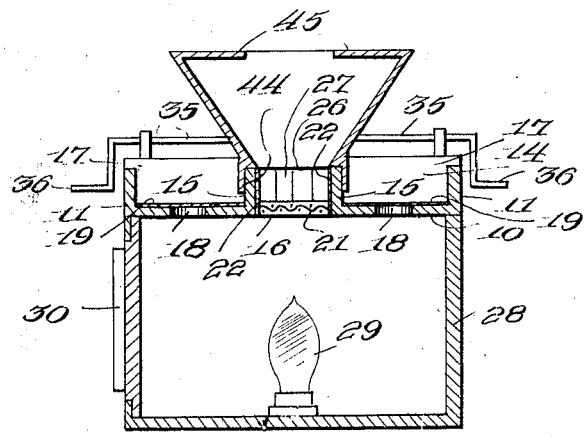
Figure 7:
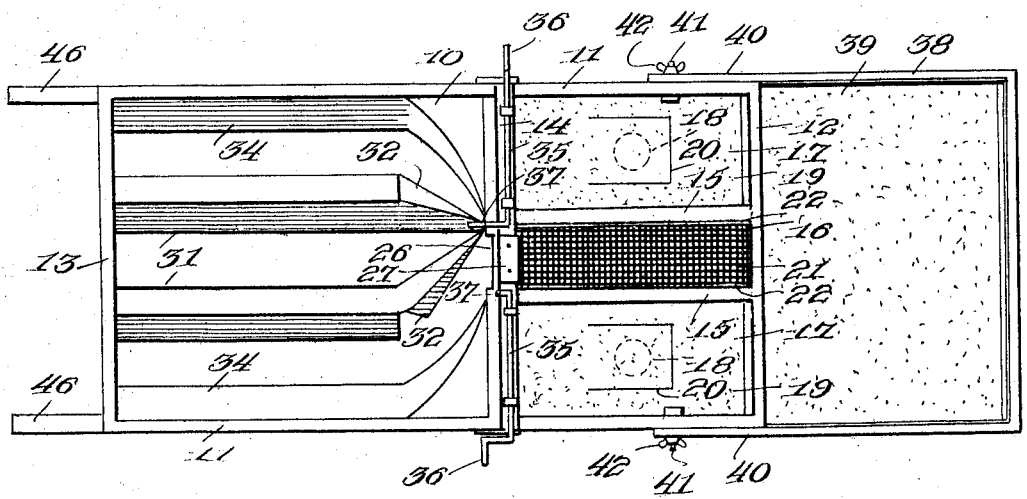
Figure 6:
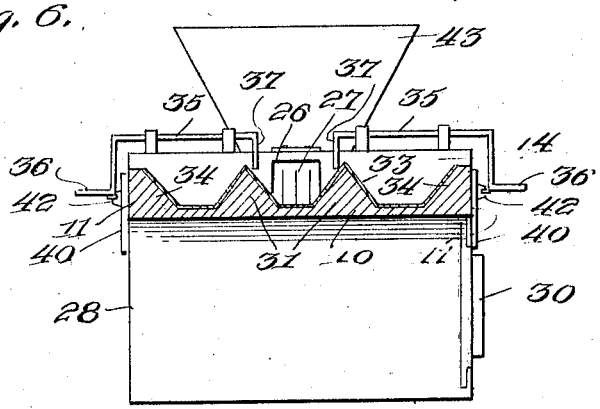

Figure 1 is a side elevation of the device,
Fig. 2 is a plan view,
Fig. 3 is a longitudinal sectional view,
Fig. 4 is a cross sectional view taken through the egg holding tray and looking toward the entrance to the testing compartment,
Fig. 5 is a cross sectional view through the testing compartment,
Fig. 6 is a cross sectional view through the initial egg holding tray holding toward the discharge end of the testing compartment, and
Fig. 7 is a plan view of the complete device with the eye piece removed and showing one of the movable partitions in switching position.

Referring more particularly to the drawings, I have shown my device as comprising an elongated rectangular tray including a bottom 10, sides 11, an end 12, another end 13, and a partition 14. The space between the end 13 and partition 14 is divided by longitudinal partitions 15 into three compartments, 16 the central one, and 17 the outer ones. The floor of the compartments 17 are formed with holes 18 and are covered with felt or the like 19 which is cut to form flaps 20 which may cover the holes 18 or not, as the case may be. The central compartment 16 has its bottom open and covered by wire screen 21 and the inner sides of the partitions 15 forming the walls of the central compartment 16 are covered with felt or the like 22.

The rear end wall 13 is formed with an opening 23 at the rear end of the central compartment 16 and this opening is normally closed by a hinged door 24 having a turn-button catch 25. The partition 14 is provided with an opening 26 normally covered by a piece of fabric 27 slit, as shown, whereby to be readily movable to permit the passage of eggs therethrough.

Located beneath the rear end portion of this tray, that is beneath the compartments 16 and 17, is a rectangular casing 28 which constitutes a lamp box and located within this casing is a suitable source of light which may preferably be an incandescent bulb 29 connected with any suitable source of current in the ordinary manner. One end of this casing 28 is of course open and normally closed by a sliding door 30 by means of which access may be had to the lamp for effecting a replacement or repairs.

The space between the end 12 and the partition 14 is designed for holding eggs and this space is subdivided by a plurality of longitudinal partitions 31 which are rigid throughout the major portions of their lengths but which have their ends toward the partitions 14 movable and formed as separate strips 32. These partitions 31 are covered with fabric 33 which is also secured upon the strip 32 and this fabric serves as a flexible connection having a hinge nature and permitting movement of the strips 32. At the sides 11 of the tray are provided fabric covered strips 34 which have their ends toward the partition 14 curved and secured to the partition 14 at opposite sides of the opening 26 therein. Ordinarily the strips 32 are in such position that they aline with the partitions 31 and with the partitions 15.

The spaces between the partitions 31 and between the partitions 31 and strips 34 are designed to be filled with eggs to be tested and it will be apparent that a large number of eggs may be stored in these places, depending of course upon the dimensions of the tray.

In order that the strips 32 may be maintained normally in alinement with the partitions 31 and 15, I provide locking means which includes a pair of rods 35 pivoted upon the top of the partition 14 and having their outer ends formed with crank handles 36 and their inner ends formed with crank arms 37 engageable against the confronting sides of the strips 32.

Detachably connected with the rear end of the tray is a final egg receiving tray 38 having a felt covered bottom 39 and including a rectangular frame having projecting arms 40 detachably connected with the sides 11 as by means of bolts 41 carrying wing nuts 42. This tray 38 is designed to receive eggs passing through the compartment 16 and out through the door 24.

Disposed over the compartment 16 and partly over the compartments 17 is an eye piece 43 frusto-pyramidal in shape, and having its bottom or base formed with an opening 44 of the same size and shape as the compartment 16 and having its top open and provided with side flanges 45, the purpose of this eye piece being to exclude outside light from the eggs passing through the compartment 16.

Under ordinary conditions the device may be disposed in a relatively small space as the eye piece 43 and tray 38 are removable. When the use of the device is desired it is supported in inclined position as by means of legs 46 pivoted upon the forward end of the main tray, these legs being foldable out of the way when the device is in inoperative condition. The device being supported in inclined position, as shown in Fig. 1, and the bulb 29 being energized, the use of the device is as follows:

Eggs to be tested are placed within the main tray between the partitions 31 and between the partitions 31 and the strips 34. The compartment 16 is also filled with eggs, the door 24 being held closed by the turnbutton 25. The operator then places the eye piece 43 so that the opening 44 in the bottom thereof will be over the compartment 16 and he then opens the door 24 and permits the eggs within the compartment 16 to roll through the compartment and through the door opening 23 into the tray 38, it being a simple matter for the operator to check too free movement of the eggs by means of his hand. The eggs between the partitions 31 will then all enter the compartment 16 successively through the opening 26 and as the eggs roll over the screen 21, the operator may readily inspect the eggs in an efficient manner as a source of light will project rays through the screen and through the eggs to the eye of the operator. When the space between the partitions 31 is emptied the operator then moves one of the rods 35 whereupon the pressure of the eggs at that side of the partition 31 will cause the strip 32 to swing over toward the other strip 32 so that the eggs within this compartment of the main tray will pass to the opening 26 and into the compartment 16. When this second series of eggs has been tested, the operator moves the other crank rod 35 whereupon the other strips 32 will be released so that the remaining series of eggs will be led to the opening 26 and into the testing compartment 16. The perfect eggs are permitted to remain within the tray 38 while those lacking in freshness may be removed and placed temporarily within the compartments 17.

When it is desired to test eggs which are in process of incubation use is made of the compartments 17, the flaps 20 being swung out of obstructing relation to the holes 18. An egg of this character to be tested is placed within either compartment 17 immediately over the hole 18 therein and the operator places the eye piece 43 in such position that the opening 44 in the bottom thereof will be disposed over the compartment 17 within which the egg to be tested is placed. The egg may then be examined very carefully and may be manually turned so that all sides may be inspected to ascertain whether or not the egg is fertile and incubating or whether it is simply becoming decayed.

From the foregoing description and a study of the drawings it will be apparent that I have thus provided an extremely efficient egg testing device by means of which a large number of eggs may be quickly and easily examined, the operation being continuous and it being unnecessary to bring the eggs to a state of rest especially as the rolling of the eggs over the screen through which the light passes permits inspection from all sides.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A device of the character described comprising an inclined tray formed at one end with a plurality of compartments, a central compartment having a foraminous bottom and having entrance and exit openings, a source of light below said foraminous bottom, an eye piece disposed over the compartment having the foraminous bottom, means for leading eggs into said compartment, and a receiving tray adapted to receive eggs passing through said compartment.

2. A device of the character described comprising an inclined tray formed at one end with a plurality of compartments, a central compartment having a foraminous bottom and having entrance and exit openings, a source of light below said foraminous bottom, an eye piece disposed over the compartment having the foraminous bottom, means for leading eggs into said compartment, and a receiving tray adapted to receive eggs passing through said compartment, said receiving tray being detachably connected with the remainder of the device, and folding means being provided for holding the device in inclined position.

3. An egg tester comprising a rectangular frame divided by longitudinal partitions into a series of compartments each adapted to contain a plurality of eggs, the lower end of said frame being formed with a compartment having a perforated bottom and having an entrance opening through which the series of eggs may pass and further having an inside opening, a receiving tray disposed below said inside opening, an eye piece detachably mounted over said compartment, and a source of light beneath said compartment.

4. An egg tester comprising a rectangular frame having one end provided with a central compartment having a perforated bottom and further provided with other compartments at the sides of said central compartment, a source of light disposed within the casing beneath all of said compartments, said central compartment being provided with entrance and exit openings, a receiving tray disposed below and beyond said exit opening, an eye piece disposable selectively over said compartments, a plurality of longitudinal partitions defining egg holding channels, and means whereby eggs within either channel may be led through the entrance opening to said central compartment.

5. An egg tester comprising a rectangular frame having one end provided with a central compartment having a perforated bottom and further provided with other compartments at the sides of said central compartment, a source of light disposed within the casing beneath all of said compartments, said central compartment being provided with entrance and exit openings, a receiving tray disposed below and beyond said exit opening, an eye piece disposable selectively over said compartments, a plurality of longitudinal partitions defining egg holding channels, and means whereby eggs within either channel may be led through the entrance opening to said central compartment, said means comprising strips flexibly connected with said longitudinal partitions and normally alining therewith and with the sides of said central compartment, and means for holding said strips in said position, said holding means being releasable whereby the weight of the eggs at the sides of said longitudinal partitions will move said strips to permit passage of the eggs into said central compartment.

In testimony whereof I affix my signature.

JULIUS MOLL.